United States Patent
Fieglein et al.

(10) Patent No.: US 11,429,945 B2
(45) Date of Patent: Aug. 30, 2022

(54) OUTDOOR PAYMENT TERMINALS

(71) Applicant: Wayne Fueling Systems LLC, Austin, TX (US)

(72) Inventors: Henry Fieglein, Leander, TX (US); Steve Belt, Pflugerville, TX (US); Matthew Norris, Austin, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 364 days.

(21) Appl. No.: 16/202,506

(22) Filed: Nov. 28, 2018

(65) Prior Publication Data

US 2020/0167751 A1 May 28, 2020

(51) Int. Cl.
*G06Q 30/00* (2012.01)
*G06Q 20/20* (2012.01)
*G06Q 20/40* (2012.01)
*G06Q 30/02* (2012.01)
*G06Q 20/04* (2012.01)

(52) U.S. Cl.
CPC ......... *G06Q 20/202* (2013.01); *G06Q 20/047* (2020.05); *G06Q 20/40* (2013.01); *G06Q 30/0268* (2013.01)

(58) Field of Classification Search
None
See application file for complete search history.

(56) References Cited

U.S. PATENT DOCUMENTS

| | | | |
|---|---|---|---|
| 5,663,887 A * | 9/1997 | Warn | G07F 13/025 700/232 |
| 6,152,591 A * | 11/2000 | McCall | B67D 7/106 235/380 |
| 6,360,138 B1 * | 3/2002 | Coppola | G06Q 20/341 700/231 |
| 6,442,448 B1 * | 8/2002 | Finley | B67D 7/145 700/231 |
| 7,107,231 B1 * | 9/2006 | Hall | G06Q 30/02 705/14.27 |
| 10,108,943 B2 * | 10/2018 | Harrell | G07F 9/023 |
| 2003/0028285 A1 * | 2/2003 | Zura | G06Q 10/08 700/241 |

(Continued)

FOREIGN PATENT DOCUMENTS

| | | | | |
|---|---|---|---|---|
| EP | 1143388 A2 * | 10/2001 | ........... | G06Q 20/341 |
| WO | WO-0075065 A2 * | 12/2000 | ............ | B67D 7/145 |
| WO | WO-2007059004 A2 * | 5/2007 | .......... | G06Q 20/347 |

*Primary Examiner* — Michael Bekerman
(74) *Attorney, Agent, or Firm* — Mintz Levin Cohn Ferris Glovsky and Popeo, P.C.

(57) ABSTRACT

Various exemplary outdoor payment terminals and methods of using outdoor payment terminals are provided. In general, data signals can be transmitted between a payment terminal configured to receive payment information from a customer and a point of sale (POS) configured to authorize the customer's payment and provide various commands, e.g., instructions, to the payment terminal. A payment terminal can include a translator configured to translate commands transmitted from the POS to the payment terminal so the payment terminal carries out the type of command requested by the POS but executes in a way that accounts for payment terminal functionality unknown to the POS.

27 Claims, 4 Drawing Sheets

(56) References Cited

U.S. PATENT DOCUMENTS

| | | | | |
|---|---|---|---|---|
| 2005/0002417 | A1* | 1/2005 | Kelly | H04L 69/08 |
| | | | | 370/466 |
| 2009/0129403 | A1* | 5/2009 | Harrell | G07F 13/02 |
| | | | | 370/467 |
| 2009/0265638 | A1* | 10/2009 | Carapelli | G07F 9/023 |
| | | | | 705/76 |
| 2013/0246171 | A1* | 9/2013 | Carapelli | G06Q 20/3278 |
| | | | | 705/14.51 |
| 2014/0100692 | A1 | 4/2014 | Chittenden, Jr. et al. | |
| 2017/0355588 | A1* | 12/2017 | Fieglein | G07F 9/023 |
| 2018/0009652 | A1 | 1/2018 | Fieglein et al. | |

* cited by examiner

OUTDOOR PAYMENT TERMINALS

FIELD

The present disclosure relates generally to outdoor payment terminals and methods of using outdoor payment terminals.

BACKGROUND

Various product dispensers exist that can dispense products. For example, the retail petroleum industry utilizes various types of fuel dispensers for dispensing fuel to customers. Some form of a remote dispenser controller is traditionally used for controlling the actual dispensing of fuel by the fuel dispensers. The dispenser controller is often at the same site as the fuel dispensers and coupled to a store interface unit so that a site attendant can monitor and control particular fuel dispensers from a building at the site (e.g., a gas station or other store). The dispenser controller sends data signals to the fuel dispensers providing various information and commands thereto. The information traditionally includes price, preset amounts of fuel to dispense, and authorization to dispense fuel. The fuel dispensers likewise send data signals to the dispenser controller, traditionally including pump number, pump status, dispensed fuel volume, and sale value.

For fuel dispensers which allow local payment, some other form of point of sale (POS) system is traditionally used to control the payment functionality of the fuel dispenser. The POS system is often on the same site as the fuel dispensers and sends data signals to the dispensers providing various information and commands thereto. The information traditionally includes user prompting controls, graphics, and media for display on the dispenser's display screen. The fuel dispensers likewise send data signals to the POS system, traditionally including pump number, prompt status, transaction data, and sale value. However, fuel dispensers and other product dispensers that are controlled by a POS system are typically more technologically advanced than the POS system since they are being developed faster than POS systems and since fuel dispensers and other product dispensers are typically added to existing sites with an existing POS system. The POS system may thus be unable to transmit complete instructions to the fuel dispensers and other product dispensers because the POS does not recognize all the functionality of the fuel dispensers and other product dispensers. It is typically expensive to upgrade or replace POS systems, so some functionality of the fuel dispensers and other product dispensers cannot be properly utilized. Additionally, the instructions received at the fuel dispensers and other product dispensers from the POS do not take into account the functionality of the fuel dispensers and other product dispensers that the POS does not recognize. The fuel dispensers and other product dispensers may therefore not be able to utilize this functionality because the POS instructions take priority.

For example, a POS system typically does not support media for display, such as advertisements, local news, etc., whereas fuel dispensers and other product dispensers often can display media. A POS instruction regarding a payment prompt for display at the dispenser will thus not take into account media being displayed by the dispenser such that the media will not be displayed at all or will display improperly because payment-related POS instructions for display at the dispenser have priority over other display functions of the dispenser. Thus, media will not be displayed at the dispenser at least at certain times due to the POS's limitations.

Similar issues exist with terminals that do not dispense products but that do communicate with a POS system and do accept payment for products dispensed elsewhere and/or for services. Examples of such terminals include parking terminals that accept payment for parking space(s), terminals that accept payment for pharmacy items, and terminals that accept payment for groceries to be delivered.

Accordingly, there remains a need for improved payment terminals.

SUMMARY

In general, outdoor payment terminals and methods of using outdoor payment terminals are provided. In particular, methods and devices for performing, via a mobile device, payment transactions for products dispensable from the product dispenser, are provided.

In one aspect, a payment system is provided that in one embodiment includes a payment terminal including a controller, a communication unit, and a payment reader configured to receive payment information from a customer. The system also includes a non-transient machine-readable medium storing instructions which, when executed by the controller, configure the payment terminal to perform operations including providing a prompt, using the controller, to the customer for a transaction purchasing at least one of a product and a service. The instructions, which, when executed by the controller, also configure the payment terminal to perform operations including receiving a response, at the payment terminal, to the prompt, transmitting, over a network using the communication unit, data indicative of the response from the payment terminal to a point of sale located outside of the payment terminal and, in response, receive, over the network, a command from the point of sale. The command instructs the payment terminal to provide information to the customer via the payment terminal, and the command identifies the information to be provided. The instructions, which, when executed by the controller, also configure the payment terminal to perform operations including, in response to receiving the command, providing information to the customer via the payment terminal in a form different than the information identified in the command.

The payment system can vary in any number of ways. For example, the instructions which, when executed by the controller, can also configure the payment terminal to perform operations including, in response to receiving the instructions, identifying one or more additional commands pre-programmed at the payment terminal that correspond to the commands, and providing the information according to the identified one or more instructions. For another example, the instructions which, when executed by the controller, can also configure the payment terminal to perform operations including receiving a second response to the information provided to the customer, translating the second response into a form recognized by the point of sale, and transmitting, over the network using the communication unit, data indicative of the translation from the payment terminal to the point of sale. For yet another example, the command can instruct the payment terminal to provide a receipt for the purchase, and providing the information to the customer can include the payment terminal providing the receipt in a form unsupported by the point of sale. For still another example, the command can instruct the payment terminal to prompt the customer for purchase of an additional product or service known by the point of sale to be available for purchase, and providing the information to the customer can include the payment terminal prompting the customer to purchase an additional product or service not known by the point of sale to be available for purchase. For another example, the command can instruct the payment terminal to display media identified in the command on a display of the payment terminal, the payment terminal can include a memory having stored therein media that is not supported by the point of sale, and providing the information to the customer can include the payment terminal causing the display to display the media that is not supported by the point of sale. For still another example, the payment terminal can include a fuel dispenser. For yet another example, the payment terminal can include one of a terminal configured to accept payment for a parking space, a terminal configured to accept payment for a pharmacy item, and a terminal configured to accept payment for groceries to be delivered.

For another example, the payment system can include the point of sale configured to communicate with the remotely located payment authorization system to authorize payment for the purchase. In at least some embodiments, the point of sale can be located inside a store, and the payment terminal can be located outside of the store.

In another embodiment, a payment system includes a payment terminal including a payment reader, a communication unit, and a controller. The system also includes a non-transient machine-readable medium storing instructions which, when executed by the controller, configure the payment terminal to perform operations including receiving payment information, via the payment reader, from a customer for payment of at least one of a product and a service. The instructions which, when executed by the controller, also configure the payment terminal to perform operations including transmitting, over a network using the communication unit, the payment information to a point of sale and, in response, receive data from the point of sale, over a network, indicating that the payment is authorized and receive a command from the point of sale for completing a purchase of a plurality of predetermined items. The point of sale is configured to communicate with a remotely located payment authorization system to authorize payment for the purchase. The payment terminal is also configured to, in response to receiving the data and the command, cause, using the controller, the command to be executed and cause, using the controller, an additional command to be executed at the payment terminal. The additional command is unsupported by the point of sale.

The payment system can have any number of variations. For example, the command can instruct the payment terminal to provide a receipt for the purchase, and the additional command can instruct the payment terminal to provide the receipt in a form unsupported by the point of sale. For another example, the command can instruct the payment terminal to prompt the customer for purchase of an additional product or service known by the point of sale to be available for purchase, and the additional command can instruct the payment terminal to prompt the customer to purchase an additional product or service not known by the point of sale to be available for purchase. For yet another example, the command can instruct the payment terminal to display media identified in the command on a display of the payment terminal, the payment terminal can include a memory having stored therein media that is not supported by the point of sale, and the additional command can instruct the payment terminal to cause the display to display the media that is not supported by the point of sale. For still another example, the payment terminal can include a memory installed therein, the memory can have stored therein the point of sale module, and the point of sale module can be configured to be programmed after the memory has been installed in the payment terminal to allow for selective updating of the point of sale module after the memory installation. For another example, the payment terminal can include a fuel dispenser. For yet another example, the payment terminal can include one of a terminal configured to accept payment for a parking space, a terminal configured to accept payment for a pharmacy item, and a terminal configured to accept payment for groceries to be delivered.

For another example, the payment system can include the point of sale configured to communicate with the remotely located payment authorization system to authorize payment for the purchase of the plurality of predetermined items. In at least some embodiments, the point of sale can be located inside a store, and the payment terminal can be located outside of the store.

In another aspect, a payment method is provided that in one embodiment includes providing a prompt, at a payment terminal, to a customer for a transaction purchasing at least one of a product and a service. The method also includes receiving a response, at the payment terminal, to the prompt, transmitting, over a network using a communication unit of the payment terminal, data indicative of the response from the payment terminal to a point of sale located outside of the payment terminal and, in response, receiving, over the network, at the payment terminal a command from the point of sale. The command instructs the payment terminal to provide information to the customer via the payment terminal. The command identifies the information to be provided. The method also includes, in response to receiving the command, providing information to the customer via the payment terminal in a form different than the information identified in the command.

The method can vary in any number of ways. For example, the method can include, in response to receiving the command, identifying a command pre-programmed at the payment terminal that correspond to the command, and providing the information according to the identified command. For another example, the method can include receiving a second response, at the payment terminal, to the information provided to the customer, translating, at the payment terminal, the second response into a form recognized by the point of sale, and transmitting, over the network using the communication unit, data indicative of the translation from the payment terminal to the point of sale. For yet another example, the command can instruct the payment terminal to provide a receipt for the purchase, and providing the information to the customer via the payment terminal can include the payment terminal providing the receipt in a form unsupported by the point of sale. For another example, the command can instruct the payment terminal to prompt to the customer for purchase of an additional product or service known by the point of sale to be available for purchase, and providing the information to the customer via the payment terminal can include the payment terminal prompting the customer to purchase an additional product or service not known by the point of sale to be available for purchase. For yet another example, the command can instruct the payment terminal to display media identified in the command on a display of the payment terminal, the payment terminal can include a memory having stored therein media that is not supported by the point of sale, and providing the information to the customer via the payment terminal can include the payment terminal causing the display to display the media that is not supported by the point of sale. For still another example, the point of sale can be located inside a store, and the payment terminal can be located outside of the store. For another example, the payment terminal can include a fuel dispenser. For yet another example, the payment terminal can include one of a terminal configured to accept payment for a parking space, a terminal configured to accept payment for a pharmacy item, and a terminal configured to accept payment for groceries to be delivered.

Non-transitory computer program products (e.g., physically embodied computer program products) are provided that store instructions, which when executed by one or more data processors of one or more computing systems, causes at least one data processor to perform operations herein. Similarly, computer systems are also provided that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

BRIEF DESCRIPTION OF DRAWINGS

The present disclosure will be more fully understood from the following detailed description taken in conjunction with the accompanying drawings, in which.

DETAILED DESCRIPTION

Figure 1:
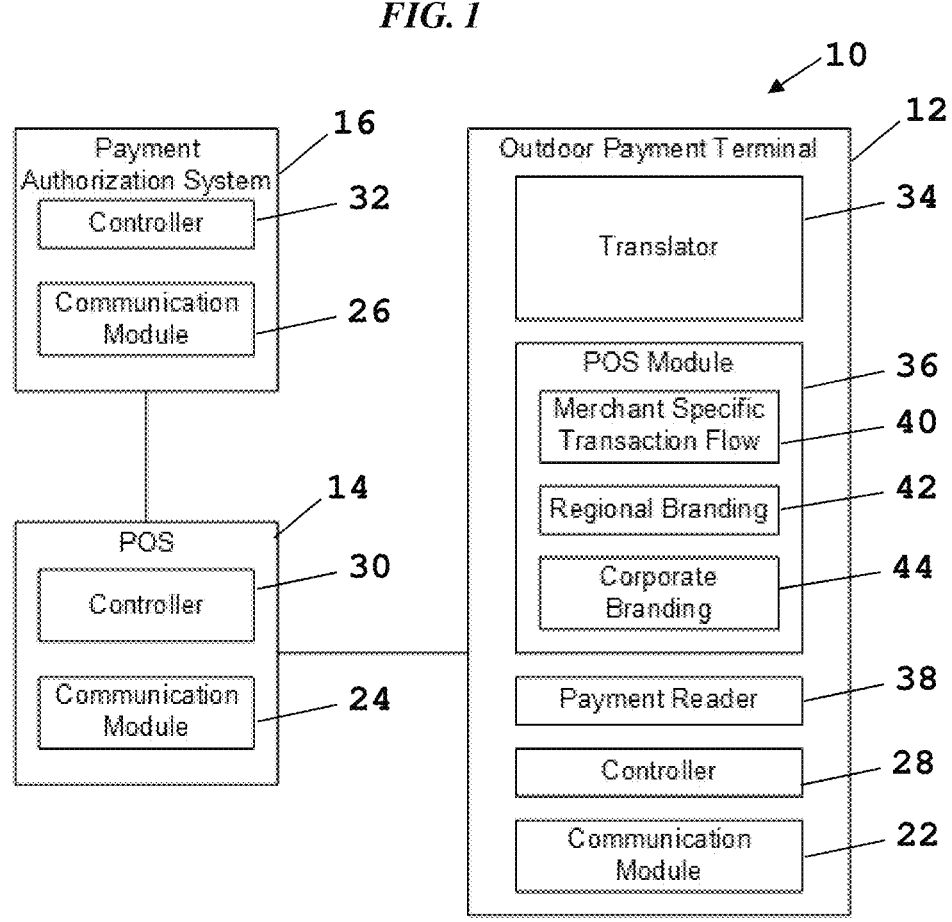
FIG. 1 is a schematic view of one embodiment of a payment system.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon.

Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Various exemplary outdoor payment terminals and methods of using outdoor payment terminals are provided. In general, data signals can be transmitted between a payment terminal configured to receive payment information from a customer and a point of sale (POS) configured to authorize the customer's payment and provide various commands, e.g., instructions, to the payment terminal. However, when the payment terminal is replaced with a newer payment terminal or when components of the payment terminal are replaced or upgraded, the new or upgraded payment terminal may have capabilities or functionality beyond that of the POS. As a result, the POS cannot command the payment terminal to utilize to utilize the new or upgraded functionality. In order to overcome this issue, a payment terminal can thus include a translator configured to translate commands transmitted from the POS to the payment terminal. This allows the payment terminal to carry out the type of commands requested by the POS, but to execute commands in a way that accounts for payment terminal functionality unknown to the POS. Accordingly, the translator allows the payment terminal's full functionality to be utilized despite certain function(s) of the payment terminal being unknown to the POS. The translator can also be configured to translate data to be transmitted from the payment terminal to the POS in reply to commands received from the POS, thus allowing the POS to interpret data from the payment terminal.

In certain embodiments, the translator can be pre-programmed with a standard flow of a transaction that the POS typically instructs the payment terminal to execute in order to process a customer payment. The translator can also be pre-programmed with one or more commands corresponding to at least some of the commands the POS may transmit to the payment terminal in the transaction flow. The pre-programmed one or more commands can each be related to functionality of the payment terminal that is unknown to the POS. In response to receiving a command from the POS in the transaction flow, the payment terminal can be configured to determine which of the pre-programmed one or more commands correspond to the received command and, if any, execute the pre-programmed one or more commands. The payment terminal can thus utilize functionality that is unknown to the POS based on commands transmitted from the POS to the payment terminal.

In an exemplary embodiment, the payment terminal is located outdoors and is configured to communicate with a point of sale (POS) that is located indoors. For example, the POS can be located inside of a store, and the payment terminal can be located outside of the store at the site of the store, e.g., in the store's parking lot, as a kiosk next to the store's front door, etc. POSs are typically located indoors for security reasons. Payment terminals may be located outdoors for any of a variety of reasons, such as because the good(s)/service(s) being paid for are dispensed outdoors by the payment terminal for safety, convenience, or other reasons, because it allows for good(s)/service(s) to be purchased from a merchant when the merchant's store in which the POS is located is closed, etc.

The payment terminal can have a variety of forms. In an exemplary embodiment, the payment terminal includes one of a fuel dispenser configured to accept payment for fuel to be dispensed via the fuel dispenser, and a terminal configured to accept payment for goods and services. Examples of goods and services include a parking space, a pharmacy item, and groceries to be delivered.

For example, in the context of a payment terminal including a fuel dispenser, the fuel dispenser can be configured to provide media to a customer that is unsupported by the POS, such as by the media being in a format unsupported by the POS (e.g., the POS not supporting real time media such as current weather forecasts or current traffic conditions, the POS supporting media in the form of still images but not in the form of video, etc.), or by the POS believing that the fuel dispenser cannot display media in addition to displaying fuel purchase information (e.g., a prompt for a customer to input a personal identification number (PIN) via the fuel dispenser's keypad, an indication that fuel payment has been authorized and that the customer may begin dispensing fuel from the fuel dispenser, etc.) when the fuel dispenser actually is configured to display media in addition to fuel purchase information (e.g., because the fuel dispenser has multiple displays, the fuel dispenser is configured to provide media in one format such as audio and the fuel purchase information in another format such as visual, etc.). The fuel dispenser's translator can be configured to translate a command to provide media received from the POS into a command that allows the fuel dispenser to provide media of the type requested by the POS, e.g., to offer additional good(s) and/or service(s) to the customer for purchase, to display advertisement(s) to the customer during fuel dispensing, etc., in a format unsupported by the POS. Other types of payment terminals can be similarly configured to provide media to a customer that is unsupported by the POS.

For another example in the context of a payment terminal including a fuel dispenser, the fuel dispenser can be configured to prompt a customer with an offer to purchases good(s) and/or service(s) that are not known to the POS, e.g., good(s) and/or service(s) unavailable at the time the POS was programmed and/or installed at the site, e.g., because the site did not yet offer those good(s) and/or service(s) onsite, because the good(s) and/or service(s) are available from a third party vendor that did not yet have a business relationship with the site's merchant, etc. The fuel dispenser's translator can be configured to translate a command to prompt the customer with a purchase offer received from the POS into a command that allows the fuel dispenser to provide an offer to purchase good(s) and/or service(s) unknown to the POS. One example of a service unknown to the POS is a car wash available at the fueling station site, e.g., because an automated car wash machine was installed at the fueling station site at some point after the fueling station opened with the POS onsite, or for other reasons. The fuel dispenser's translator can allow the fuel dispenser to prompt the customer to purchase a car wash at a discounted price due to the customer's authorized fuel purchase. Other types of payment terminals can be similarly configured to prompt a customer with an offer to purchases good(s) and/or service(s) that are not known to the POS.

For yet another example in the context of a payment terminal including a fuel dispenser, the fuel dispenser can be configured to provide a receipt for payment in a form unsupported by the POS, such as by the POS being configured to prompt the fuel dispenser to provide a receipt in the form of a paper receipt and the fuel dispenser being configured to provide a receipt in multiple formats such as paper, email, text, etc. The fuel dispenser's translator can be configured to translate a command to provide a receipt received from the POS into a command that allows the fuel dispenser to provide a receipt in a format unsupported by the POS, e.g., to translate a command to print a paper receipt into a command to prompt the customer to select one of a plurality of different formats in which to receive the receipt, to translate a command to print a paper receipt into a command to email a receipt to the customer and display a message on the fuel dispenser's display indicating that the receipt has been emailed, etc. Other types of payment terminals can be similarly configured to provide a receipt for payment in a form unsupported by the POS.

FIG. 1 illustrates one embodiment of a system 10 including a payment terminal 12 and a POS 14 configured to communicate with the payment terminal 12. In this illustrated embodiment the payment terminal 12 is located outdoors, e.g., outdoors and outside of a store at a merchant site, and the POS 14 is located indoors, e.g., inside of the store at the merchant site. The system 10 also includes a third party payment authorization system 16 configured to communicate with the POS 14 to authorize customer payments, as will be appreciated by a person skilled in the art.

The payment terminal 12 and the POS 14 are configured to communicate over a network via a first communication link 18, and the POS 14 and the payment authorization system 16 are configured to communicate over a network via a second communication link 20. The first and second communication links 18, 20 can be wired or wireless. Examples of wireless communication include Local-Area-Network (LAN), Wireless LAN (WLAN), Ethernet, Bluetooth, cellular, and the like. Examples of wired communication include a controller area network bus (CAN Bus) connection, an RS485 connection, a current loop connection, and the like. Each of the payment terminal 12, POS 14, and payment authorization system 16 includes a communication module 22, 24, 26 configured to facilitate electronic communication via its associated communication link(s) 18, 20 and a controller 28, 30, 32 configured to control its associated communication module, e.g., to execute software instructions implementing the communication module. The communication modules 22, 24, 26 can each include one or more antennas to facilitate communication via its associated communication link(s) 18, 20.

The payment terminal 12 includes a translator 34, an embedded POS module 36, and a payment reader 38. The payment reader 38 is configured to receive payment information from a customer. The payment terminal 12 is configured to use the received payment information in processing a transaction using the translator 34 and the POS module 36. The payment reader 38 is configured to be accessible to a customer via an exterior of the payment terminal 12 to facilitate the customer's payment for good(s) and/or service(s). In at least some implementations the good(s) and/or service(s) are dispensable from the payment terminal 12 such that the customer receives instant delivery of the paid-for good(s) and/or service(s), e.g., fuel from the payment terminal 12 as a fuel dispenser, air from the payment terminal 12 as a compressed air dispenser, parking space reserved via the payment terminal 12 as a parking terminal, etc. The good(s) and/or service(s) can be received at a later time, however, such as groceries delivered to the customer's residence after payment at the payment terminal 12, pharmacy products delivered to the customer's residence after payment at the payment terminal 12, etc.

The payment reader 38 can have a variety of configurations, as will be appreciated by a person skilled in the art. One example of the payment reader 38 is a card reader configured to interface with a customer's card, e.g., credit card, debit card, etc. Another example of the payment reader 38 is a mobile payment gateway configured to interface with a customer's mobile terminal such as a mobile phone. The payment reader 38 can, in at least some embodiments, include multiple types of customer payment interfaces, e.g., both a card reader and a mobile payment gateway. In other embodiments, the payment reader 38 can include only one type of customer payment interface. The payment reader 38 including only a mobile payment gateway may allow for avoidance of any change in card reader standards, such as a change to the EMV technical standard, which may be a very costly change and/or may become outdated quickly as technology and consumer preferences change. The controller 28 is configured to control operation of the payment reader 38 in this illustrated embodiment, as will be appreciated by a person skilled in the art.

The translator 34 is a second controller of the payment terminal 12 in this illustrated embodiment, although in other implementations the translator 34 can be incorporated into the controller 28. The translator 34 being a second controller may facilitate upgrading of existing payment terminals by allowing addition of the translator 34 thereto and/or may facilitate replacing the translator 34 without having to replace the more expensive controller 28.

In general, the translator 34 is configured to translate a command received from the POS 14 to allow the payment terminal 12 to utilize functionality of the payment terminal 12 that is unknown to the POS 14, and thus that the POS 14 is not able to instruct the payment terminal 12 to use. In response to a command being received by the payment terminal 12 from the POS 14 via the first communication link 18 in the flow of a transaction involving payment for good(s)/service(s), the translator 34 is configured to perform the translation. The POS module 36 is configured to be accessed by the translator 34 to facilitate the translator's translation. The POS module 36 has stored therein, as pre-programmed information, merchant specific transaction flow data 40, regional branding data 42, and corporate branding data 44. The translator 34 is also configured to translate data to be transmitted to the POS 14 in response to the POS's command.

The translation performed by the translator 34 can include translating and expanding a single element of data or command to multiple elements of data or commands (a 1 to N operation). In other implementations, the reverse can occur where the translator 34 receives a number of commands or data inputs and translates and combines them to a single data element or command (an N to 1 operation). The translation can be performed by a central processing unit (CPU) that can be embedded in a translator board that is part of the translator 34. In other implementations, the translator 34 can be in a computer chip that can be installed in a circuit board. The translator 34 can have translation software to facilitate the translation. In some implementations, the translator software can be installed, for example, during the production process, when the translator 34 is installed on the payment terminal 12, as part of an update, or the like.

When a command is received by the payment terminal 12 from the POS 14 in the flow of a transaction involving payment for good(s)/service(s), the translator 34 is configured to access the POS module 36 to determine if one or more other commands should be executed instead of or in addition to the received command. The merchant specific transaction flow data 40 includes possible commands that the POS 14 may transmit to the payment terminal 12 in the flow of the transaction involving payment for good(s)/service(s) and, for each of the possible commands, one or more other commands that should be executed in addition to or instead of the received command. The merchant specific transaction flow data 40 is specific to the merchant providing the good(s)/service(s) since different merchants can have different transaction flows due to, e.g., different kinds of POSs, different advertising strategies of different merchants, different customer loyalty programs for different merchants, etc. In other implementations, the transaction flow data 40 need not be merchant specific, which may reduce cost of the POS module 36 since it need not be customized for a particular merchant but can instead be implemented with default, merchant-neutral programming.

The merchant specific transaction flow data 40 includes a conversion table, e.g., a lookup table, database, or other conversion data, that provides the basis for the translation by correlating each of the possible commands in the flow either with no other commands, such that the received command is executed as provided by the POS 14, or with one or more other commands, such that the one or more other commands are additionally or alternatively executed as provided in the conversion table. The conversion table is stored in a dedicated memory, or the like, of the translator 34 or stored on another dedicated memory, or the like, elsewhere on the payment terminal 12. The conversion table is configured to be read by the translator 34 to identify the one or more other commands, if any, to be executed.

The merchant specific transaction flow data 40 can be captured manually based on current transaction flow being driven from the POS 14. The manual capture can be performed by, e.g., marking pages of the transaction during a set of test transactions to identify the transaction flow. Once the flow is identified the flow's sequence of events, e.g., sequence of commands, can be stored in the conversion table. This default flow can be modified to be merchant specific by editing the sequence of events based on the particular merchant's preferred flow. For example, a merchant may desire for the flow to be modified based on good(s) and/or service(s) offered by the merchant at the site of the payment terminal 12. For example, in the instance of the payment terminal 12 including a fuel dispenser, the merchant may offer multiple car wash tiers available for redemption at a car wash at the same site as the payment terminal 12. The flow may thus be modified for the payment terminal 12 to cause a customer prompt to be provided via the payment terminal 12 after the customer has input payment information for fuel asking if the customer would like to add on any of the car wash tiers to the customer's fuel purchase, e.g., to add a command for car wash tier prompting in response to receiving a command from the POS 14 to prompt for fuel payment information from the customer. Further, another command may be added for the payment terminal 12 to provide a particular advertisement related to the car wash when providing the car wash tiers prompt.

The command received from the POS 14 can in some instances be affected by region, e.g., affected by a region in which the payment terminal 12 is geographically located, and/or affected by corporate affiliation, e.g., affected by the particular merchant providing the payment terminal 12. For example, a command from the POS 14 instructing the payment terminal 12 to provide media during the payment transaction can be affected by region, such as when the media is entertainment in which case playing a local radio station via the payment terminal 12 may be preferable to playing national radio programming, or when the media is an advertisement in which case an advertisement for a good or service available for purchase on site or at a nearby establishment may be preferable to another good or service to help encourage the purchase. A command to provide media can be similarly affected by corporate affiliation, e.g., providing an advertisement for a good or service offered by the same merchant the customer is currently attempting to purchase from via the payment terminal 12. For another example, a command from the POS 14 instructing the payment terminal 12 to provide a receipt for an authorized payment may be affected by corporate affiliation, such as if the receipt is to include a logo of the merchant, in which case the current logo design should be used.

The conversion table identifies commands affected by region and/or corporate affiliation, thereby prompting the translator 34 to access the regional branding data 42 for commands identified as being affected by region and to access the corporate branding data 44 for commands identified as being affected by corporate affiliation. The translator 34 can thus execute the type of command provided by the POS 14 by instead executing the one or more other commands identified in the conversion table that include regional branding and/or corporate branding. For example, a POS command to display an advertisement on the payment terminal 12 while the POS 14 is communicating with the payment authorization system 16 to authorize payment information received via the payment reader 38 can be executed by the payment terminal 12 to display a regionally branded advertisement that is unknown to the POS 14. For another example, a POS command to provide a receipt for payment can be executed by the payment terminal 12 to include thereon the merchant's corporate logo as identified in the corporate branding data 44 despite the logo being unknown to the POS 14. The regional branding data 42 and the corporate branding data 44 can each be configured to be updated on demand, either locally or remotely, to help ensure that the data 42, 44 is up to date.

A command from the POS 14 to the payment terminal 12 can be, for example, a hex code or strings, octets, binary code, analog electrical pulses, or the like that can be interpreted by the payment terminal's controller 28 as a command and set to the translator 34 for further processing. In at least some implementations, the translator 34 can have a single format, or otherwise limited number of formats, that it is able to translate. Accordingly, there can be multiple translators 34 at the payment terminal 12 that can be concurrently installed to each handle different types of translation. The conversion table can store commands according to vendor, model, or the like. A single conversion table can include commands in different formats, or multiple conversion tables can be provided each dedicated to a certain format.

In at least some instances, the POS 14 expects a reply from the payment terminal 12 in response to a command transmitted by the POS 14, e.g., a reply indicating that the command has been executed so the POS 14 can provide the next instruction in the transaction flow. If the payment terminal 12 executes the command received from the POS 14 without translation, the payment terminal 12 can transmit a reply to the POS 14 according to usual procedures. If the payment terminal 12 executes the command received from the POS 14 with translation such that one or more other commands are executed instead of or in addition to the received command, the translator 34 can format the reply to be in a form expected by the POS 14, e.g., in a form that does not reflect the executed one or more other commands that are unknown and unable to be understood by the POS 14. The transaction flow may this proceed smoothly.

To facilitate N to 1 translation, the translator 34 includes a buffer for an array to store incoming commands received from the POS 14 by the payment terminal 12 until the required number of commands is received for combination into the single command. For example, when the translator 34 receives a partial command, the conversion table can identify this as a partial command. The translator 34 is configured to wait until other partial commands have been received which together can be combined into a single command. That single command can then be translated by the translator 34 with identified command(s) then being executed.

A command from the POS 14 to the payment terminal 12 may be in a format incompatible with the payment terminal 12. For example, the command may be only for certain model(s) of payment terminals of which the payment terminal 12 is not one, e.g., because the payment terminal 12 is made by a different manufacturer than manufacturers recognized by the POS 14. In such a case, the translator 34 can be configured to translate the command from the format as transmitted to a second format compatible with the payment terminal 12. The translator 34 can be similarly configured to translate commands from the second format to the format compatible with the POS 14 so the payment terminal 12 can transmit commands to the POS 14 that the POS can understand and process. Embodiments of translating data between formats are described in U.S. Pat. Pub. 2018/0009652 entitled "Fuel Dispenser Communication" filed Jul. 11, 2016, which is hereby incorporated by reference in its entirety.

Figure 2:
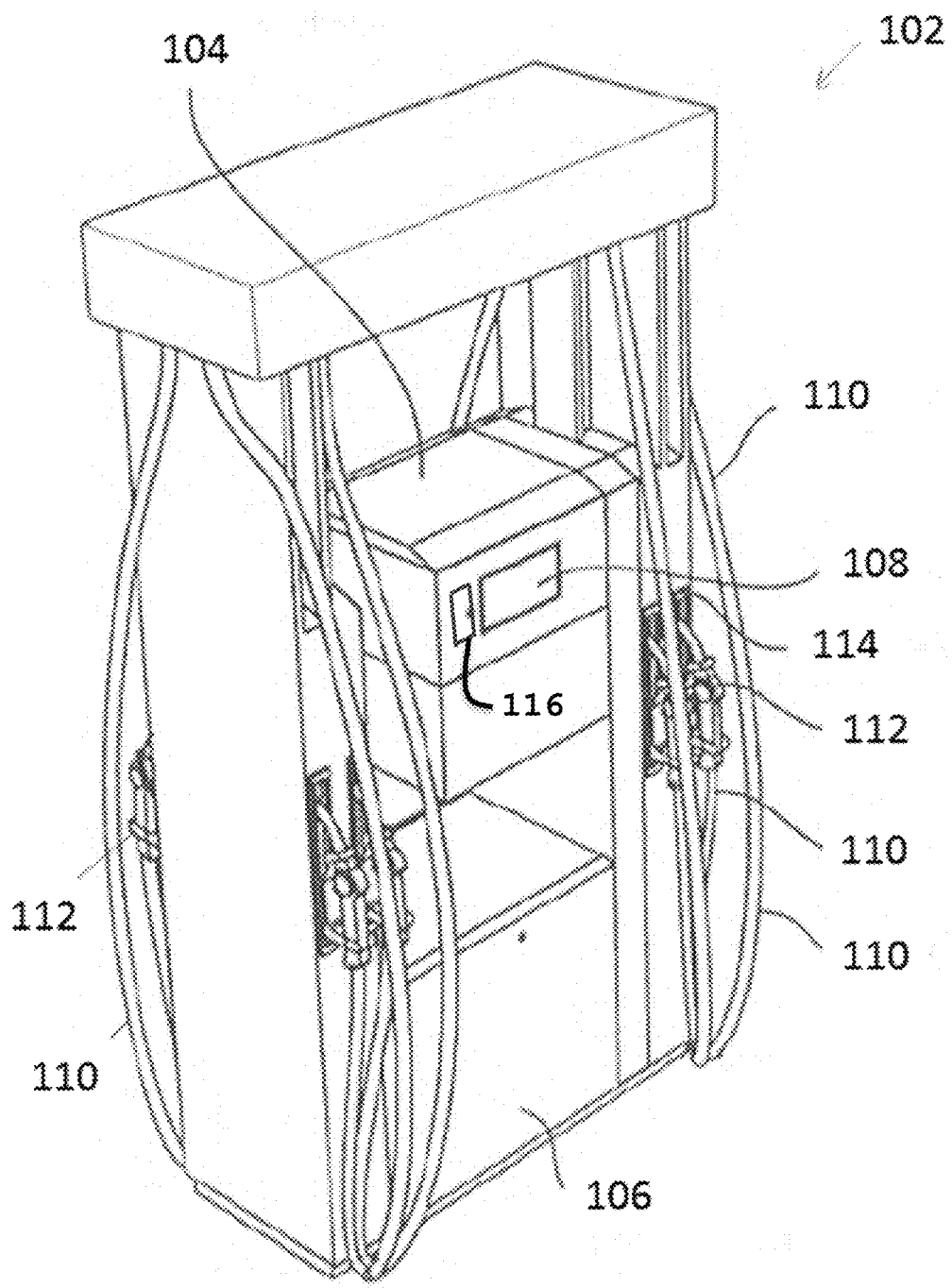
FIG. 2 is a perspective view of one embodiment of a fuel dispenser.
Figure 3:
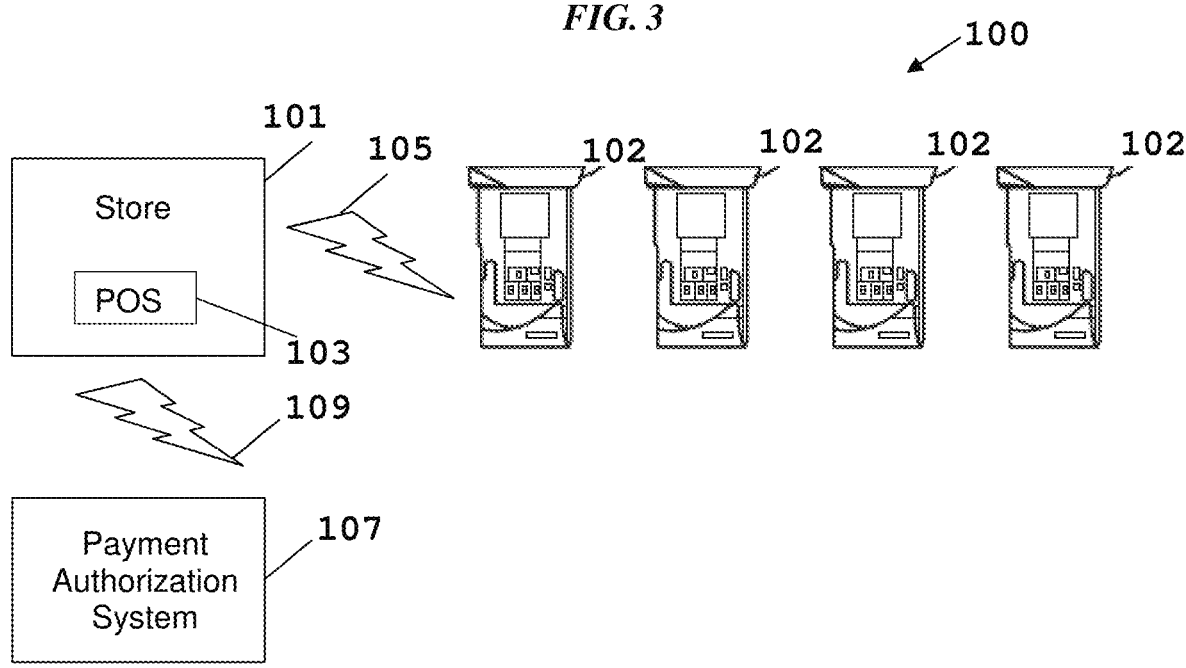
FIG. 3 is a schematic view of one embodiment of a fueling system including a plurality of the fuel dispensers of FIG. 2.

FIG. 2 illustrates one embodiment of a payment terminal in the form of a fuel dispenser 102. FIG. 3 illustrates a system 100 including a plurality of the fuel dispensers 102 at a fueling site, e.g., a fueling station or the like. A store 101 including a POS 103 is also located at the fueling site, with the POS 103 being configured to communicate with each of the fuel dispensers 102 via a first communication link 105 and with a third party payment authorization system 107 via a second communication link 109. As will be appreciated by a person skilled in the art, the system 100 can include a forecourt controller (not shown) disposed along the first communication link 105 between the dispensers 102 and the POS 103. Exemplary forecourt controllers are described in, for example, U.S. Pat. Pub. No. 2014/0100692 entitled "System And Method To Process Transactions At Retail Fueling Stations Using A Mobile Device" filed Mar. 29, 2013, and U.S. Pat. No. 6,360,138 entitled "Pump And Customer Access Terminal Interface Computer Converter To Convert Traditional Pump And Customer Access Terminal Protocols To High Speed Ethernet Protocols" filed Apr. 6, 2000, which are hereby incorporated by reference in their entireties.

Figure 4:
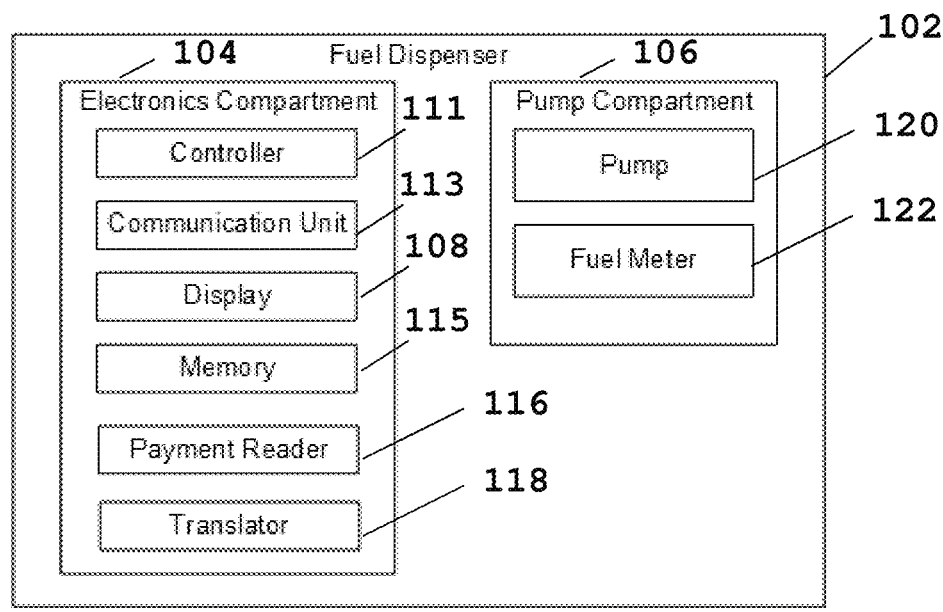
FIG. 4 is a schematic view of a portion of the fuel dispenser of FIG. 2.

As shown in FIGS. 2 and 4, the fuel dispenser 102 includes an electronics compartment 104 and a pump compartment 106. The electronics compartment 104 has therein electronics for facilitating payment for fuel and for facilitating the dispensing of the fuel. The electronics include, for example, a fuel controller 111 configured to control dispensing of the fuel from the pump compartment, a communication unit 113 configured to electronically communicate wired and/or wirelessly over a network, a display 108 configured to show information (e.g., media content, payment information, etc.) thereon, a memory 115 configured to store data therein, a payment reader 116 (including, e.g., a card reader, a keypad, a mobile phone Bluetooth communication unit, etc.) configured to receive customer payment data and process customer payment, and a translator 118. Similar components can be located on the other side of the electronics compartment 104 that is obscured from view in FIG. 2. The fuel dispenser 102 can be configured for mobile payment instead of or in addition to payment through the payment terminal and hence need not include the payment terminal.

The pump compartment 106 has therein a pump 120 configured to pump fuel from a fuel tank or other reservoir and has therein a fuel meter 122 configured to monitor fuel flow. The pump compartment 106 can include other elements to facilitate fuel dispensing, such as valves, a vapor recovery system, etc., as will be appreciated by a person skilled in the art. The pump compartment 106 is isolated from the electronics compartment 104 within the fuel dispenser 102 to facilitate safety, security, and/or maintenance, as will also be appreciated by a person skilled in the art. Fuel is thus not allowed to flow from the pump compartment 106 to the electronics compartment 104 and instead flows from the pump compartment 106 through hoses 110 to nozzles 112 for dispensing. As will be appreciated by a person skilled in the art, the nozzles 112 are each configured to dispense fuel from the fuel dispenser 102 as pumped therefrom by the pump 120.

The fuel dispenser 102 is configured to be connected to the fuel tank or other reservoir containing fuel. When filling up the tank of a motor vehicle, the fuel is pumped from the tank or reservoir by the pump 120 located in the pump compartment 106 and to a nozzle 112 via a fuel pipe (not shown) and a fuel hose 110. When each fuel hose 110 is not in use, the fuel hose 110 hangs along the fuel dispenser 102, and its associated nozzle 112 is seated in a nozzle boot 114. The illustrated fuel dispenser 102 includes four hoses 110 and four nozzles 112 on one side of the dispenser 102 and four hoses 110 and four nozzles 112 on the other side of the dispenser 102, but as will be appreciated by a person skilled in the art, the fuel dispenser 102 can include any number of hoses 110 and nozzles 112. A person skilled in the art will also appreciate that the fuel dispenser 102 can have various other configurations.

Figure 5:
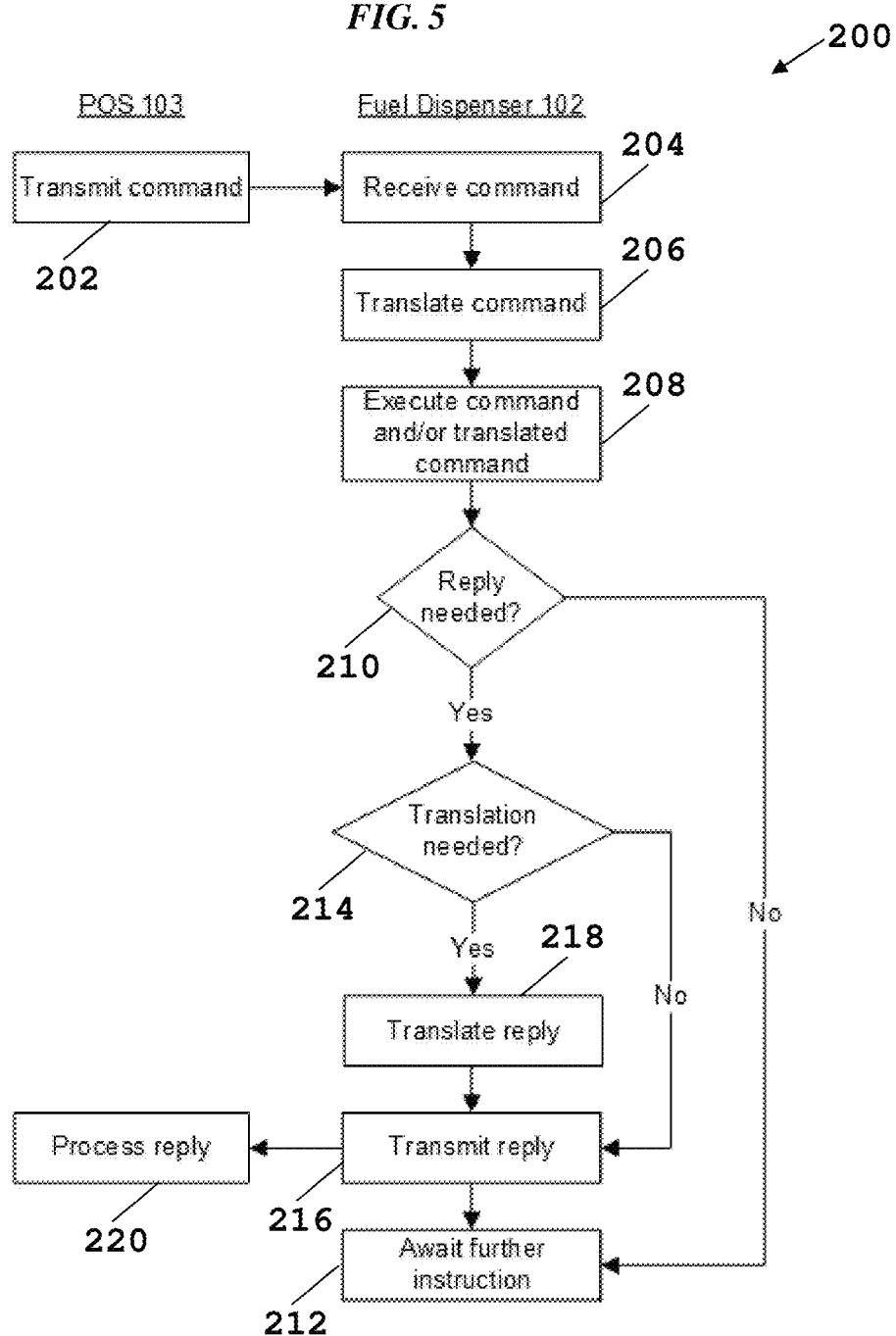
FIG. 5 is a flowchart of a method of one embodiment of using a payment terminal.

FIG. 5 illustrates one embodiment of a method 200 of using a payment terminal. The method 200 is described with respect to the system 100 of FIG. 3 and the fuel dispenser 102 of FIGS. 2-4, but the method 200 can be similarly implemented in other systems and with other payment terminals described herein.

In the method 200 the POS 103 transmits 202 a command over the first communication link 105 to the fuel dispenser 102 in a flow of a transaction involving customer payment for good(s)/service(s) via the fuel dispenser 102. A plurality of commands are transmitted from the POS 103 to the fuel dispenser 102 over the course of the transaction, but only one command transmission 202 is shown here for ease of explanation.

The fuel dispenser 102 receives 204 the command via the communication unit 113. The translator 118 translates 206 the received command as described herein, e.g., uses a conversion table to determine whether to execute 208 the command as received or to instead or additionally execute 208 one or more other commands as identified in the conversion table. The fuel dispenser 102, e.g., the controller 111 thereof, determines 210 whether a reply to the POS 103 is needed, a determination which is based on the nature of the transmitted command 202, as will be appreciated by a person skilled in the art. For example, a command to provide a receipt via the fuel dispenser 102 may not require a reply to the POS 103 if no error is encountered providing the receipt, with the POS 103 assuming that the receipt is properly provided unless informed otherwise by the fuel dispenser 102. For another example, a command to provide an advertisement on the display 108 may not require a reply because the POS 103 will assume that the advertisement is displayed. For yet another example, a command to prompt a customer to provide a PIN via the fuel dispenser's payment reader 116 may require a reply to the POS 103, e.g., for the input PIN to be provided to the POS 103.

If no reply is determined 210 to be needed, the fuel dispenser 102 awaits 212 further instruction from the POS 103.

If a reply is determined 210 to be needed, the fuel dispenser 102, e.g., the controller 111 thereof, determines 214 whether translation of the reply is needed. Translation is not needed if the command was executed 208 as received, in which case the controller 111 prepares and transmits 216 a reply to the POS 103. The POS 103 processes 218 the reply and continues the transaction flow. Translation is needed if one or more other commands were executed, in which case the translator 118 translates 218 the reply into a form expected by the POS 103, transmits 216 the translated reply for processing 220 by the POS, and then awaits 212 further instruction.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A payment system, comprising:
   a payment terminal including a controller, a communication unit, and a payment reader configured to receive payment information from a customer; and
   a non-transient machine-readable medium storing instructions which, when executed by the controller, configure the payment terminal to perform operations comprising:
      providing a prompt, using the controller, to the customer for a transaction purchasing at least one of a product and a service,
      receiving a response, at the payment terminal, to the prompt,
      transmitting, over a network using the communication unit, data indicative of the response from the payment terminal to a point of sale located outside of the payment terminal and, in response, receive, over the network, a command from the point of sale, the command instructing the payment terminal to provide information to the customer via the payment terminal, the command identifying the information to be provided, and
      in response to receiving the command,
         identifying the received command in transaction flow data pre-programmed at the payment terminal, the transaction flow data including a series of commands in a flow of a transaction for payment of at least one of a product and a service available for purchase via the payment terminal, and the transaction flow data correlating each of the series of commands either with no additional command or with at least one additional command,
         if the identified command is correlated in the transaction flow data with no additional command, executing the received command, and
         if the identified command is correlated in the transaction flow data with at least one additional command, executing the at least one additional command.

2. The system of claim 1, wherein the instructions which, when executed by the controller, configure the payment terminal to perform operations further comprising:
   receiving a second response to the information provided to the customer,
   translating the second response into a form recognized by the point of sale, and
   transmitting, over the network using the communication unit, data indicative of the translation from the payment terminal to the point of sale.

3. The system of claim 1, wherein the command instructs the payment terminal to provide a receipt for the purchase in a form supported by the point of sale, the identified command is correlated in the transaction flow data with at least one additional command, and executing the at least one additional command causes the payment terminal to provide the receipt in a form unsupported by the point of sale.

4. The system of claim 1, wherein the command instructs the payment terminal to prompt the customer for purchase of an additional product or service known by the point of sale to be available for purchase, the identified command is correlated in the transaction flow data with at least one additional command, and executing the at least one additional command causes the payment terminal to prompt the customer to purchase an additional product or service not known by the point of sale to be available for purchase.

5. The system of claim 1, wherein the command instructs the payment terminal to display media identified in the command on a display of the payment terminal;
   the payment terminal includes a memory having stored therein media that is not supported by the point of sale; and
   the identified command is correlated in the transaction flow data with at least one additional command, and executing the at least one additional command causes the display to display the media that is not supported by the point of sale.

6. The system of claim 1, further comprising the point of sale configured to communicate with a remotely located payment authorization system to authorize payment for the purchase.

7. The system of claim 6, wherein the point of sale is located inside a store, and the payment terminal is located outside of the store.

8. The system of claim 1, wherein the payment terminal includes a fuel dispenser.

9. The system of claim 1, wherein the payment terminal includes one of a terminal configured to accept payment for a parking space, a terminal configured to accept payment for a pharmacy item, and a terminal configured to accept payment for groceries to be delivered.

10. The system of claim 1, further comprising a forecourt controller;
    wherein the data indicative of the response is transmitted along a communication link from the payment terminal to the point of sale via the forecourt controller, which is disposed along the communication link between the payment terminal and the point of sale.

11. The system of claim 1, wherein executing the received command comprises providing information to the customer via the payment terminal in a form same as information identified in the received command; and
    executing the at least one additional command comprises providing information to the customer via the payment terminal in a form different than the information identified in the received command.

12. The system of claim 1, wherein if the identified command is correlated in the transaction flow data with at least one additional command, the at least one additional command is executed instead of the received command.

13. The system of claim 1, wherein the instructions which, when executed by the controller, configure the payment terminal to perform operations further comprising:
if the identified command is correlated in the transaction flow data with at least one additional command, executing the received command in addition to executing the at least one additional command.

14. A payment system, comprising:
a payment terminal including a payment reader, a communication unit, and a controller; and
a non-transient machine-readable medium storing instructions which, when executed by the controller, configure the payment terminal to perform operations comprising:
receiving payment information, via the payment reader, from a customer for payment of at least one of a product and a service,
transmitting, over a network using the communication unit, the payment information to a point of sale and, in response, receive data from the point of sale, over a network, indicating that the payment is authorized and receive a command from the point of sale for completing a purchase of a plurality of predetermined items, the point of sale being configured to communicate with a remotely located payment authorization system to authorize payment for the purchase, and
in response to receiving the data and the command,
identifying, using the controller, which one of a series of commands pre-programmed at the payment terminal corresponds to the received command, the series of commands corresponding to a standard flow of commands in a transaction for purchase of at least one of a product and a service,
identifying, using the controller, an additional command that is pre-programmed at the payment terminal as correlating to the identified one of the series of commands, and
causing, using the controller, the identified additional command to be executed at the payment terminal, the identified additional command being unsupported by the point of sale.

15. The system of claim 14, wherein the command instructs the payment terminal to provide a receipt for the purchase in a form supported by the point of sale, and the execution of the identified additional command causes the payment terminal to provide the receipt in a form unsupported by the point of sale.

16. The system of claim 14, wherein the command instructs the payment terminal to prompt the customer for purchase of an additional product or service known by the point of sale to be available for purchase, and the execution of the identified additional command causes the payment terminal to prompt the customer to purchase an additional product or service not known by the point of sale to be available for purchase.

17. The system of claim 14, wherein the command instructs the payment terminal to display media identified in the command on a display of the payment terminal;
the payment terminal includes a memory having stored therein media that is not supported by the point of sale; and
the execution of the identified additional command causes the display to display the media that is not supported by the point of sale.

18. The system of claim 14, further comprising the point of sale configured to communicate with the remotely located payment authorization system to authorize payment for the purchase of the plurality of predetermined items.

19. The system of claim 18, wherein the point of sale is located inside a store, and the payment terminal is located outside of the store.

20. The system of claim 14, wherein the payment terminal includes a fuel dispenser.

21. The system of claim 14, wherein the payment terminal includes one of a terminal configured to accept payment for a parking space, a terminal configured to accept payment for a pharmacy item, and a terminal configured to accept payment for groceries to be delivered.

22. The system of claim 14, wherein the standard flow of commands is specific to a merchant providing the at least one of the product and the service.

23. The system of claim 14, wherein the standard flow of commands is not specific to a merchant providing the at least one of the product and the service.

24. A payment method, comprising:
providing a prompt, at a payment terminal, to a customer for a transaction purchasing at least one of a product and a service;
receiving a response, at the payment terminal, to the prompt;
transmitting, over a network using a communication unit of the payment terminal, data indicative of the response from the payment terminal to a point of sale located outside of the payment terminal and, in response, receiving, over the network, at the payment terminal a command from the point of sale, the command instructing the payment terminal to provide information to the customer via the payment terminal, the command identifying the information to be provided; and
in response to receiving the command,
identifying the received command in transaction flow data pre-programmed at the payment terminal, the transaction flow data indicating a series of commands in a flow of a transaction for payment of at least one of a product and a service available for purchase via the payment terminal, and the transaction flow data correlating each of the series of commands either with no additional command or with at least one additional command,
if the identified command is correlated in the transaction flow data with no additional command, executing the received command, and
if the identified command is correlated in the transaction flow data with at least one additional command, executing the at least one additional command.

25. The method of claim 24, further comprising receiving a second response, at the payment terminal, to the information provided to the customer;
translating, at the payment terminal, the second response into a form recognized by the point of sale; and
transmitting, over the network using the communication unit, data indicative of the translation from the payment terminal to the point of sale.

26. The method of claim 25, wherein the transaction flow data is pre-programmed at the payment terminal as a conversion table;
the payment terminal includes one of a fuel dispenser, a terminal configured to accept payment for a parking space, a terminal configured to accept payment for a pharmacy item, and a terminal configured to accept payment for groceries to be delivered; and the one of the fuel dispenser, the terminal configured to accept payment for a parking space, the terminal configured to accept payment for a pharmacy item, and the terminal configured to accept payment for groceries to be delivered includes a translator that translates the second response using the conversion table.

27. The system of claim 1, wherein the non-transient machine-readable medium stores the transaction flow data as a conversion table and identifying the received command in the transaction flow data comprises using the conversion table to identify a one of the series of commands that corresponds to the received command and using the conversion table to determine if the identified one of the series of commands is correlated in the transaction flow data with no additional command or with the at least one additional command.

* * * * *